United States Patent
Agarwal et al.

(10) Patent No.: US 12,511,642 B2
(45) Date of Patent: Dec. 30, 2025

(54) USING A CONVERSATION INTERFACE TO TRANSFER DIGITAL ASSETS

(71) Applicant: Celligence International LLC, Guaynabo, PR (US)

(72) Inventors: Pavan Agarwal, Dorado, PR (US); Gabriel Albors Sanchez, San Juan, PR (US); Jonathan Ortiz Rivera, San Juan, PR (US); Thomas Smith, Guaynabo, PR (US)

(73) Assignee: Celligence International LLC, Guaynabo, PR (US)

( * ) Notice: Subject to any disclaimer, the term of this patent is extended or adjusted under 35 U.S.C. 154(b) by 126 days.

(21) Appl. No.: 18/213,762

(22) Filed: Jun. 23, 2023

(65) Prior Publication Data

US 2023/0419301 A1    Dec. 28, 2023

Related U.S. Application Data

(60) Provisional application No. 63/355,569, filed on Jun. 24, 2022.

(51) Int. Cl.
  *G06Q 20/36* (2012.01)
  *G06Q 20/12* (2012.01)
  *G06Q 20/38* (2012.01)
  *G06Q 20/40* (2012.01)

(52) U.S. Cl.
  CPC ........... *G06Q 20/36* (2013.01); *G06Q 20/123* (2013.01); *G06Q 20/363* (2013.01); *G06Q 20/3821* (2013.01); *G06Q 20/3829* (2013.01); *G06Q 20/4014* (2013.01)

(58) Field of Classification Search
  None
  See application file for complete search history.

(56) References Cited

U.S. PATENT DOCUMENTS

| | | | |
|---|---|---|---|
| 5,220,603 A | 6/1993 | Parker | |
| 5,566,302 A | 10/1996 | Khalidi et al. | |
| 6,006,194 A | 12/1999 | Merel | |
| 7,085,735 B1 | 8/2006 | Hall et al. | |
| 10,043,174 B1 * | 8/2018 | Chikkanna | G06Q 20/3676 |
| 10,853,791 B1 | 12/2020 | Ellis | |
| 10,992,605 B2 | 4/2021 | Agarwal et al. | |
| 11,037,154 B1 | 6/2021 | Costilla | |

(Continued)

OTHER PUBLICATIONS

Brian Quarmby, "Etherescan adds new messaging feature for anons: 'Blockscan Chat'", Jan. 25, 2022 (Year: 2022).*

(Continued)

*Primary Examiner* — Patrick McAttee
*Assistant Examiner* — Timothy Paul Sax
(74) *Attorney, Agent, or Firm* — Sheppard Mullin Richter & Hampton LLP

(57) ABSTRACT

Systems and methods are provided for facilitating digital asset transfer via natural language commands using a conversation or chat interface associated with a digital wallet application. The digital wallet owner may exchange commands with an assistant user. The assistant user may comprise an automated software agent. The digital wallet owner may transfer digital assets to a recipient's digital wallet identified by command to the assistant user. The transfer command may comprise the recipient's name preceded with a "@" notation.

16 Claims, 17 Drawing Sheets

(56) References Cited

U.S. PATENT DOCUMENTS

| | | | |
|---|---|---|---|
| 11,080,677 B2 | 8/2021 | Tripathi et al. | |
| 11,244,304 B2 | 2/2022 | Kohli et al. | |
| 11,456,869 B2 | 9/2022 | Shpurov et al. | |
| 11,468,436 B2 | 10/2022 | Mayblum et al. | |
| 11,481,559 B1 | 10/2022 | Asefi | |
| 11,501,297 B1 | 11/2022 | Tai et al. | |
| 11,663,565 B2 | 5/2023 | Grassadonia | |
| 11,790,334 B1 | 10/2023 | Corcillo | |
| 11,861,590 B1 | 1/2024 | Quigley | |
| 12,169,868 B2 | 12/2024 | Navarro et al. | |
| 12,271,895 B2 | 4/2025 | DePopas et al. | |
| 2003/0087633 A1 | 5/2003 | Yoon | |
| 2009/0323677 A1 | 12/2009 | Mehmood et al. | |
| 2010/0217603 A1 | 8/2010 | Hammond et al. | |
| 2012/0290427 A1 | 11/2012 | Reed et al. | |
| 2013/0065669 A1 | 3/2013 | Michaelson et al. | |
| 2013/0204787 A1* | 8/2013 | Dubois | G06Q 20/40 705/44 |
| 2014/0372301 A1* | 12/2014 | Anamanamuri | G06Q 20/425 705/44 |
| 2015/0178853 A1 | 6/2015 | Byron et al. | |
| 2015/0220914 A1 | 8/2015 | Purves | |
| 2016/0012465 A1* | 1/2016 | Sharp | G06Q 20/321 705/14.17 |
| 2017/0278096 A1 | 9/2017 | Chitalia | |
| 2018/0137094 A1 | 5/2018 | Zhou et al. | |
| 2019/0197530 A1 | 6/2019 | Gosalia et al. | |
| 2019/0303921 A1 | 10/2019 | Mutter | |
| 2019/0356641 A1 | 11/2019 | Isaacson | |
| 2019/0362339 A1* | 11/2019 | Gurunathan | G06Q 20/3674 |
| 2020/0042773 A1 | 2/2020 | Benkreira | |
| 2020/0073999 A1* | 3/2020 | Zucker | G06F 16/338 |
| 2020/0076798 A1* | 3/2020 | Lidsky | H04L 9/3228 |
| 2020/0322320 A1 | 10/2020 | Moon | |
| 2021/0073804 A1 | 3/2021 | Kikinis | |
| 2021/0119785 A1 | 4/2021 | Ben-Reuven et al. | |
| 2021/0209584 A1 | 7/2021 | Donald et al. | |
| 2021/0247959 A1 | 8/2021 | Agarwal et al. | |
| 2021/0256215 A1 | 8/2021 | Oddy | |
| 2021/0383351 A1 | 12/2021 | Chauhan | |
| 2021/0398091 A1 | 12/2021 | Yan | |
| 2022/0058347 A1 | 2/2022 | Singaraju | |
| 2022/0092583 A1 | 3/2022 | Ur | |
| 2022/0180364 A1* | 6/2022 | Peled | G06Q 20/3821 |
| 2022/0207525 A1 | 6/2022 | Polania | |
| 2022/0253852 A1 | 8/2022 | Wu et al. | |
| 2022/0261801 A1 | 8/2022 | Davis | |
| 2022/0270085 A1* | 8/2022 | Mee | G06Q 20/065 |
| 2022/0318424 A1 | 10/2022 | D'Agostino | |
| 2022/0318775 A1 | 10/2022 | Tomkins et al. | |
| 2023/0103796 A1 | 4/2023 | Purandare | |
| 2023/0336340 A1 | 10/2023 | Polleri | |
| 2023/0336523 A1 | 10/2023 | DeLuca | |
| 2023/0360031 A1 | 11/2023 | DeLuca | |
| 2024/0135364 A1 | 4/2024 | Agudelo | |

OTHER PUBLICATIONS

PCT International Search Report and the Written Opinion mailed Oct. 18, 2023, issued in related International Application No. PCT/US2023/026166 (8 pages).

Non-Final Office Action dated Oct. 15, 2024, issued in related U.S. Appl. No. 18/219,353 (15 pages).

"Build a Cryptocurrency Chatbot with Python: Meet Sato, the Cryptobot", Chatbots Magazine, Nov. 23, 2017. Available at: https://chatbotsmagazine.com/build-a-cryptocurrency-chatbot-with-python-meet-sato-the-cryptobot-c8dd59423f25 ( Year: 2017).

PCT International Preliminary Report on Patentability mailed Jan. 2, 2025, issued in related International Application No. PCT/US2023/026166 (7 pages).

Final Office Action dated Feb. 14, 2025, issued in related U.S. Appl. No. 18/219,353 (19 pages).

Final Office Action dated Sep. 18, 2025, issued in U.S. Appl. No. 18/219,353 (15 pages).

Non-Final Office Action dated Jun. 12, 2025, issued in U.S. Appl. No. 18/219,353 (16 pages).

* cited by examiner

Step 3 - Enter Amount 215

FIG. 2C

Step 4 - Amount Entered 220

FIG. 2D

Conventional Cryptocurrency Transaction

Step 5 - View Contacts Screen 225

Step 6 - Enter Recipient Screen 230

Step 7 - Preview Send Screen 235

Step 8 - Send Screen 240

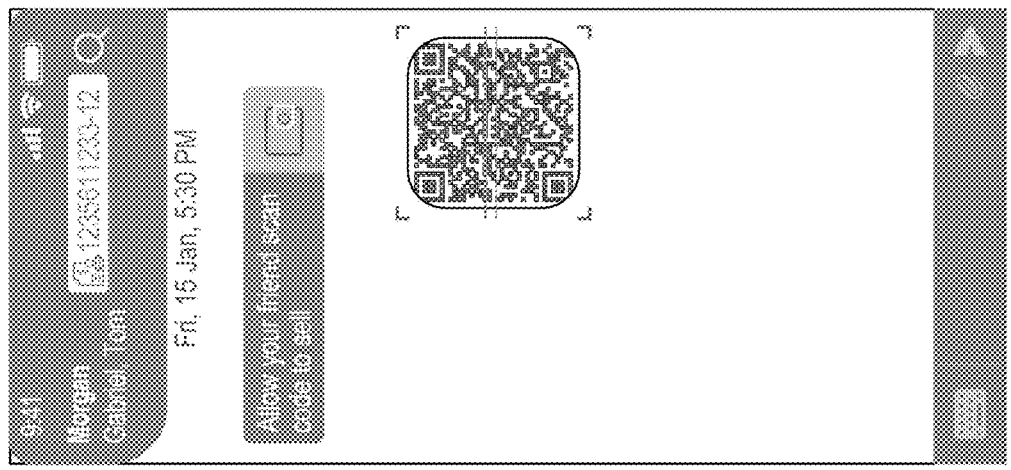
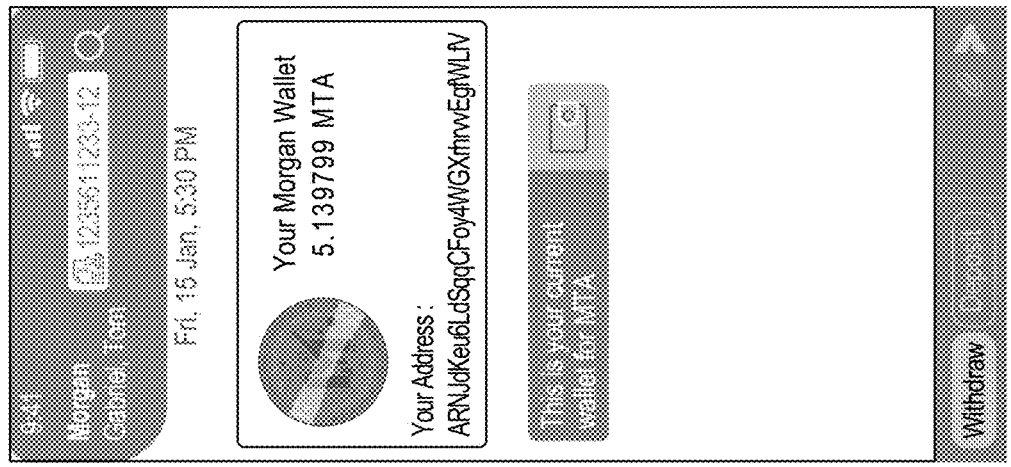
FIG. 4B

Conversation Interface Assisted by AA

Jennifer: "Good morning Morgan, what is the status of the Pavan Agarwal application?"
Morgan: "You have completed the application but there are few questions remaining. Would you like to complete it now?"
Jennifer: "Yes"
Morgan: "Your loan is ready for the Processor <<displayed as an icon>>. Your loan will be processed in Minutes and you will receive a TRUApproval by 8 AM Tomorrow. Proceed?" [YES] [NO]
Morgan: "The Processor <<displayed as an icon>> will complete the following services for your display as icons that you can click on and off. Disclosures, 2. 3. 4. 5. Please confirm you wish to proceed."
Jennifer: "Yes"
<<message is sent and displayed in the chat log>>
Message: "Execute the Process with the following options: ___, ___, ___"

FIG. 5A

Conversation Interface Assisted by AA

Morgan: "Congratulations Pavan! you are now ready to purchase real estate with a TRUApproval NFT. Conditionally Guaranteed by Sun West. Make a "No Contingency" loan offer that is often respected more than cash."
Morgan: "May I add your licensed loan officer, Jennifer, to this conversation?"
Pavan: "Yes"
<<Jennifer receives a text message from Morgan asking her to join the conversation>>
Jennifer: "Pavan, I always recommend my clients to lock and shop because interest rates are so unpredictable. I can lock you in for 90 days at X.XX%, Y% estimated APR, for a VA no down purchase 30 year fixed."
Morgan: "Pavan, do you accept the LOCK & SHOP offer?"
Pavan: "Yes"

FIG. 5B

Conversation Interface Assisted by AA

Pavan: "Morgan, I want to buy on 123 main street, corona CA for $300,000 with my TRUApproval NFT"
Morgan: "Excellent, I have requested Perla, your Realtor, to join this conversation"
Morgan: "That property is also in my listings database. Click here to view the listing"
<<Pavan clicks link to view listings>>
Morgan: "Please confirm that you wish to proceed with the purchase of this property"
Pavan: "Yes"
<<Perla receives a text message from Morgan asking her to join the conversation>>
Perla: "Excellent choice Pavan. I will submit your TRUApproved "No Contingency" Loan offer right away. Please place $3,000 earnest money deposit with Morgan."

FIG. 5C

Conversation Interface Assisted by AA Within Secure Crypto Wallet

Morgan: "You are now in a private and secure area."
Doing a check by phone (ach) via chat application that then stores the record of that transaction on the block chain and available in the consumer's crypto wallet. Another patent.
Morgan: << go through the check by phone authorization disclaimer/approval process >>
Morgan: "Do you agree t?" [Yes/No]
Morgan: "I need the following information" <<ACH workflow>>
Morgan: "Thank you. Within 48 hours $3000 will be transferred from your account to a Sun West trust account. This transaction has been connected to your TRUApproval NFT and is permanently recorded on the blockchain."

FIG. 5D

Conversation Interface Assisted by AA

Morgan: "Perla, Pavan has delivered $3000 to me. The funds will be in my trust account within 48 hours."
Morgan: "Perla, please send the e-sign offer to the borrower. Very important: please cc me (morgan@swmc.com) on that offer so that I can track it"
Perla: "Excellent, I've emailed the offer to both of you"
<<Morgan receives the cc of the docu-sign e-sign of the offer and displays it as a private message to the borrower in the chat log for borrower for execution>>
<<The borrower clicks the docu-sign link to sign and initial>>
Morgan: "Your signed offer is now recorded on the block chain with this TRUApproval. Click here to view your TRU Approval. The Tru Approval landing page should show a list of offers that have been placed but not accepted."

FIG. 5E

Conversation Interface Assisted by AA

Perla: "Pavan, I just spoke with the listing agent. I showed him your TRUApproval NFT and he saw that five other sellers were bidding for it. He didn't want to miss the chance even though he has another cash offer for the same price, in his experience TRUApprovals have a smoother closing. The Seller has accepted your offer. Congratulations!"

Morgan: "I have received the fully executed e-sign contract. Your TRUApproval NFT is now committed to the purchase of this property and the transaction is securely recorded on the blockchain."

Morgan: "Congratulations! You will own this property in a few days just as soon the appraisal and title are received and verified."

Morgan: "Pavan, here are some key reminders. Please follow these tips and we will have a quick and smooth closing."

<<Morgan provides a list of the do's and don'ts as in the TRU-terms page>>

FIG. 5F

USING A CONVERSATION INTERFACE TO TRANSFER DIGITAL ASSETS

RELATED APPLICATIONS

This application claims the benefit of U.S. Provisional Application No. 63/355,569 filed on Jun. 24, 2022, the contents of which are incorporated herein by reference in its entirety.

TECHNICAL FIELD

The present disclosure generally relates to distributed ledger computer systems. More particularly, the present disclosure relates to computer systems and processes for using conversation interface for commands for transferring digital assets via a distributed ledger network.

SUMMARY

In accordance with one or more embodiments, various features and functionality can be provided to enable or otherwise facilitate transfer of digital assets via an exchange of natural language commands in a conversation interface of a digital wallet application.

In some embodiments, the system for transferring digital assets via an exchange of natural language commands in a conversation interface of a digital wallet application may include establishing, by a processor, a first digital wallet in a data store connected to the processor. Next, the system may include storing login information for the first digital wallet. Additionally, the, a value representative of an amount of digital currency associated by the first digital wallet may also be stored by the processor.

In some embodiments, login credentials for the first wallet from a first user device may be received. Next, whether the login credentials match the login information for the first digital wallet may be verified. In some embodiments, public key for the first digital wallet and private key for the first digital wallet may also be stored.

Upon verifying the login credentials first user device may be logged into the first wallet. Once logged in, a first user input may be obtained. The first input may comprise a transfer command displayed within a conversation interface of the first digital wallet. The conversation interface may be configured to receive user input and display assistant user input (e.g., comprising one or more responses generated by an assistant user based on the user input). The assistant user may be an automated software agent.

The system may identify a second digital wallet associated with a second user by using the transfer command of the first user. In some embodiments, the transfer command may comprise the second user's name preceded with a "@" notation. In some embodiments, a transfer in the first digital wallet for an amount of digital asset from the first digital wallet to the second digital wallet may be recorded.

In some embodiments, a first assistant user response from the assistant user may be obtained. The response may include a request to confirm the digital asset. The first assistant user response generated by the assistant user may be based on the digital assets associated with the first digital wallet. In response to the request, a second user input may be obtained.

BACKGROUND

A digital asset is a catch-all term for assets that exist digitally. The term covers a wide variety of assets, including cryptocurrencies, utility tokens, security tokens, digital stocks, and digital collectables. All cryptocurrencies are digital assets, while not all digital assets are cryptocurrencies. The two most common blockchain-based digital assets are cryptocurrencies and tokens.

A digital currency (digital money, electronic money or electronic currency) is a currency that exists purely in a digital form, without a physical manifestation. Types of digital currencies include cryptocurrency, virtual currency and central bank digital currency. Digital currency may be recorded on a distributed database on the internet, a centralized electronic computer database owned by a company or bank, within digital files or even on a stored-value card.

Cryptocurrency is a sub-type of digital currency and is designed to work as a medium of exchange through a computer network that is not reliant on any central authority, such as a government or bank, to uphold or maintain it. Cryptocurrency relies on cryptography to chain together digital signatures of asset transfers, peer-to-peer networking and decentralization. Cryptocurrencies can allow electronic money systems to be decentralized. For example, when implemented with a blockchain, the digital ledger system or record keeping system uses cryptography to edit separate shards of database entries that are distributed across many separate servers. The first and most popular system is bitcoin—a peer-to-peer electronic monetary system based on cryptography. Users of the bitcoin network send and receive units of currency called bitcoins by broadcasting digitally signed messages to the network using bitcoin cryptocurrency wallet software. Transactions are recorded into a distributed, replicated public database known as the blockchain, with consensus achieved by a proof-of-work system called mining.

Within the context of blockchain technology, a token (a crypto token) generally refers to a unit of value for a programmable asset that is managed by a smart contract and an underlying distributed ledger. Tokens are the primary means of transferring and storing value on a blockchain network—most often Ethereum. Tokens can also be designed to be either fungible or non-fungible (non-fungible tokens are known as "NFTs"), depending on a network's specific needs. And while many tokens are primarily used for simple transactions, an increasing number of blockchain projects are designing tokens encoded with a variety of wide-ranging use cases, primarily in regard to on-chain governance and network maintenance.

Typically, crypto tokens are programmable, permissionless, trustless, and transparent. Programmable simply means that they run on software protocols, which are composed of smart contracts that outline the features and functions of the token and the network's rules of engagement. Permissionless means that anyone can participate in the system without the need for special credentials. Trustless means that no one central authority controls the system; instead, it runs on the rules predefined by the network protocol. And finally, transparency implies that the rules of the protocol and its transactions are viewable and verifiable by all.

While crypto tokens, like cryptocurrency, can hold value and be exchanged, they can also be designed to represent physical assets or more traditional digital assets, or a certain utility or service. For instance, there are crypto tokens that represent tangible assets such as real estate and art, as well as intangible assets such as processing power or data storage space. For example, a non-fungible token (NFT) is a cryptocurrency token that is indivisible and unique. One NFT cannot be interchanged with another NFT, and the whole cannot be broken down into smaller parts and used.

Cryptocurrency and tokens (both unique subclasses of digital assets) utilize cryptography, an advanced encryption technique that assures the authenticity of crypto assets by eradicating the possibility of counterfeiting or double-spending. The biggest differentiation between the two is that cryptocurrencies have their own blockchains, whereas crypto tokens are built on an existing blockchain.

Cryptocurrencies are the native asset of a specific blockchain protocol, whereas tokens are created by platforms that build on top of those blockchains. For instance, the Ethereum blockchain's native token is ether (ETH). While ether is the cryptocurrency native to the Ethereum blockchain, there are many other different tokens that also utilize the Ethereum blockchain. Crypto tokens built using Ethereum include DAI, LINK, COMP, and CryptoKitties, among others.

Cryptocurrency wallets come in a variety of forms, their most basic function is to store a user's private and public keys and interact with various blockchains enabling users to send and receive digital currency and monitor their cryptocurrency balances. Wallets have a public key and a private key. Public key or public address (which is simply a shortened form of the public key) can be given out to others for sending digital assets to the user's wallet, and a private key is used to confirm the transfer of digital assets from the wallet user to others. Wallets can be digital (software) or physical (hardware), hot (connected to the internet) or cold (disconnected from the internet), custodial (a trusted third party has control of a user's private keys) or non-custodial (only the user controls their private key). While some cryptocurrency wallets may only provide support for a single cryptocurrency, many are multi-asset solutions, allowing users to hold multiple cryptocurrencies, including Bitcoin, Bitcoin Cash, Ethereum, and Litecoin, among many others.

Use of a cryptocurrency (digital) wallet application is predicated on operating a graphical user interface (GUI) (i.e., a type of user interface that allows users to interact with computing devices using images rather than text-based commands) which may not be well suited for inexperienced or elderly users. For example, an inexperienced user may often have difficulties locating the correct icon or field within the GUI of the digital application when attempting to invoke desired functionality. Accordingly, a user may be forced to underutilize the capabilities of the digital wallet, or worse, end up with an unsatisfactory result. Finally, using a conventional digital wallet application is often associated with unnecessary steps (e.g., recipient registration) often making the overall experience time-consuming and prone to user error.

Methods are needed that allow users to use natural language commands when interacting with a digital wallet application assisted an automated software assistant (AA), a computer program that utilizes artificial intelligence and natural language processing to provide assistance to users via a chat interface when making digital asset transfers.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIGS. 2A-2H illustrate exemplary views of a conventional cryptographic wallet application, according to an implementation of the disclosure.

FIGS. 4A-4C illustrate example conversational interfaces used to transfer digital assets, according to an implementation of the disclosure.

FIGS. 5A-5F illustrate example conversational interface interactions, according to an implementation of the disclosure.

Described herein are systems and methods for enabling users to use natural language commands for transferring digital assets via a distributed ledger network assisted by an automated software assistant (AA). The details of some example embodiments of the systems and methods of the present disclosure are set forth in the description below. Other features, objects, and advantages of the disclosure will be apparent to one of skill in the art upon examination of the following description, drawings, examples and claims. It is intended that all such additional systems, methods, features, and advantages be included within this description, be within the scope of the present disclosure, and be protected by the accompanying claims.

DETAILED DESCRIPTION

Currently, digital assets can be transferred between users by utilizing a software application, e.g., a cryptocurrency wallet application. As alluded to above, cryptocurrency wallets are used to store users' private and public keys and interact with various blockchains thereby enabling users to send and receive digital currency and monitor their cryptocurrency balance. Wallets have a public key (or its shortened version, public address) used by others to send digital assets to the wallet's owner, and a private key used by the wallet owner to confirm the receipt of the digital asset or to transfer digital assets by the wallet owner to others. While anyone can send digital currency transactions to the public address (i.e., a public key), a private key is only used by the wallet owner when confirming ownership of the digital asset received in the transaction.

Figures 2A, 2B:
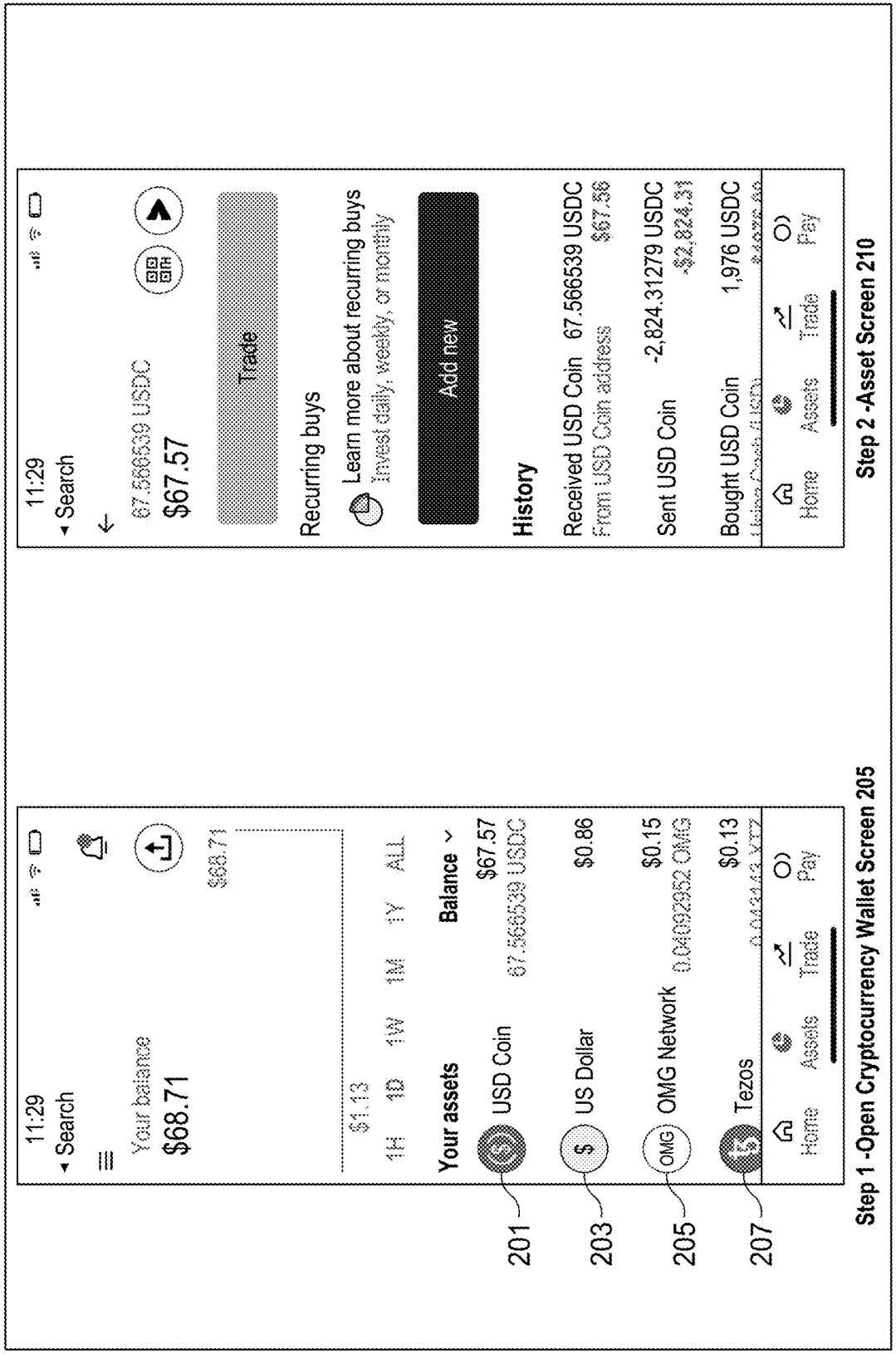
Figure 2E:
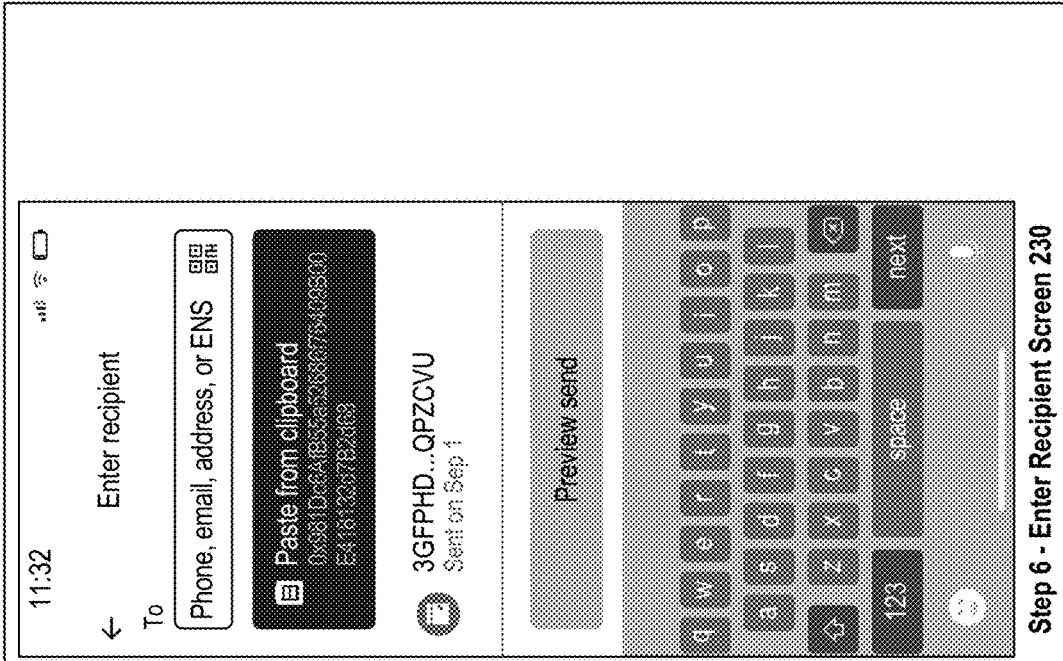
Figure 2F:
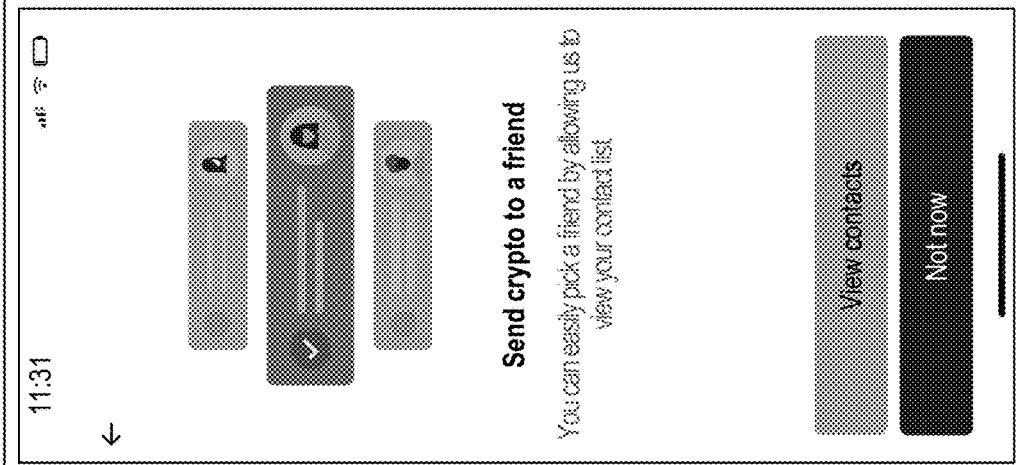
Figure 2G:
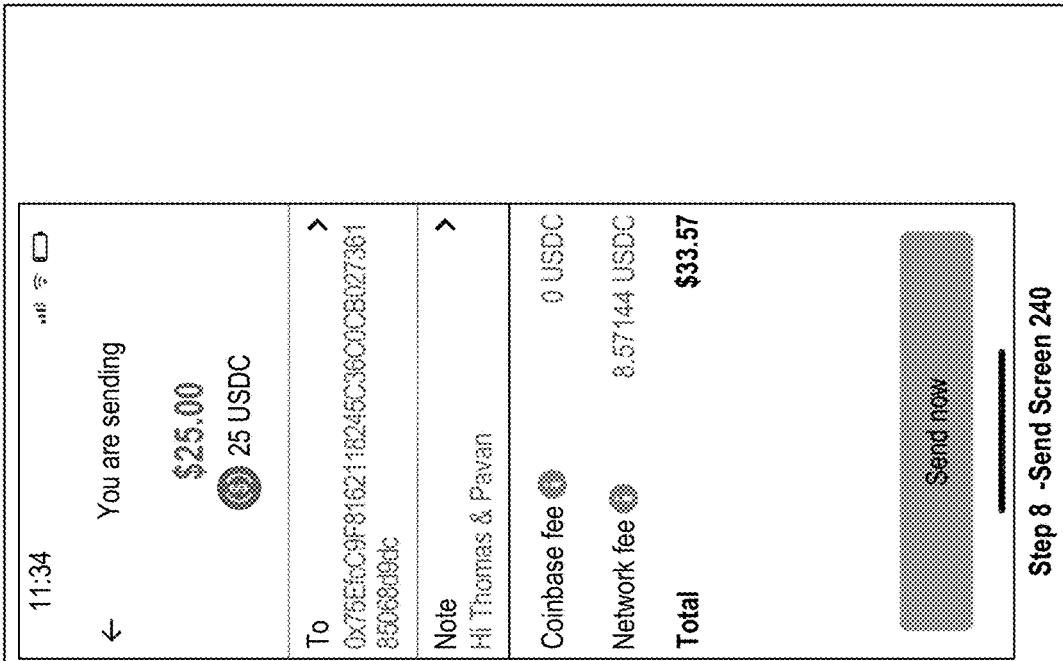
Figure 2H:
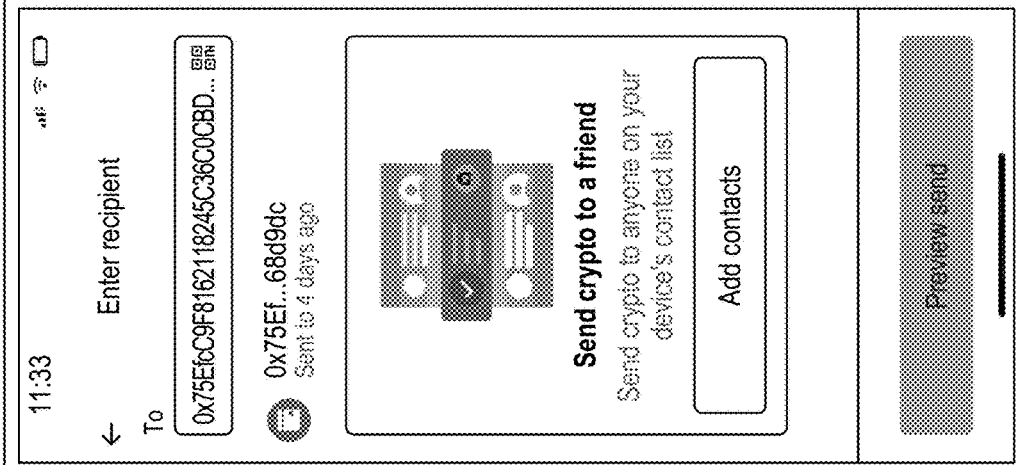

When utilizing existing cryptocurrency (crypto) wallet applications to transfer their digital assets, users are required to execute a number of steps, illustrated in FIGS. 2A-2H. For example, prior to using cryptocurrency wallet application, a user must be authenticated within the cryptocurrency wallet application by providing a username and passcode and/or by using another such method of authentication. Next, as illustrated in FIG. 2A, in step 1, the wallet owner (hereinafter the user) may be presented with cryptocurrency wallet screen 205 including a plurality of existing asset accounts 201, 203, 205, 207 (e.g., in various currencies). In step 2, the user may select a particular asset and view details, such as history, associated with that asset in screen 210, as illustrated in FIG. 2B. Once the digital asset (e.g., bitcoin) has been selected, in step 3, the user may provide amount they wish to transfer via screen 215, as illustrated in FIG. 2C. Upon entering the desired transfer amount, in step 4, the user may select to continue via screen 220, as illustrated in FIG. 2D. Next, in step 5, as illustrated in FIG. 2E, the user must provide recipient of the transfer via screen 225. Unless user's contact is associated with the crypto wallet application, in step 6, the user will have to provide recipient's name and email address via screen 230, as well as the public address (public key) associated with that recipient's wallet, as illustrated in FIG. 2F. Further, in step 7, as illustrated in FIG. 2G, the user may preview the transfer details via screen 235. Finally, in step 8, as illustrated in FIG. 2G, the user may send the asset to the recipient via screen 240.

Accordingly, conventional digital asset transfer process requires a distinct application (i.e., crypto wallet) used by users that have been authenticated, i.e., provided authentication credentials. Additionally, use of existing crypto wallets to transfer digital assets requires knowledge of the recipient contact information, e.g., public address readily available as well as sender's own public address, thereby making the transfer time-consuming and prone to user error. Existing solutions fail to provide users with an ability to transfer digital assets without having to provide all necessary information in a manner demanded by the wallet application, as described above. For example, user cannot transfer digital assets to a contact that hasn't been previously used and is simply found in their mobile device address book. Instead, a digital wallet application requires that recipient information is provided to the crypto wallet application prior to the transfer.

In accordance with various embodiments, a system and method for providing a natural language interface or conversation/chat interface for enabling a digital asset transfer via a distributed ledger network assisted by an automated software assistant (AA) is disclosed. For example, the user may send digital assets by using a natural language command entered in a conversation interface.

Environment

Figure 1:
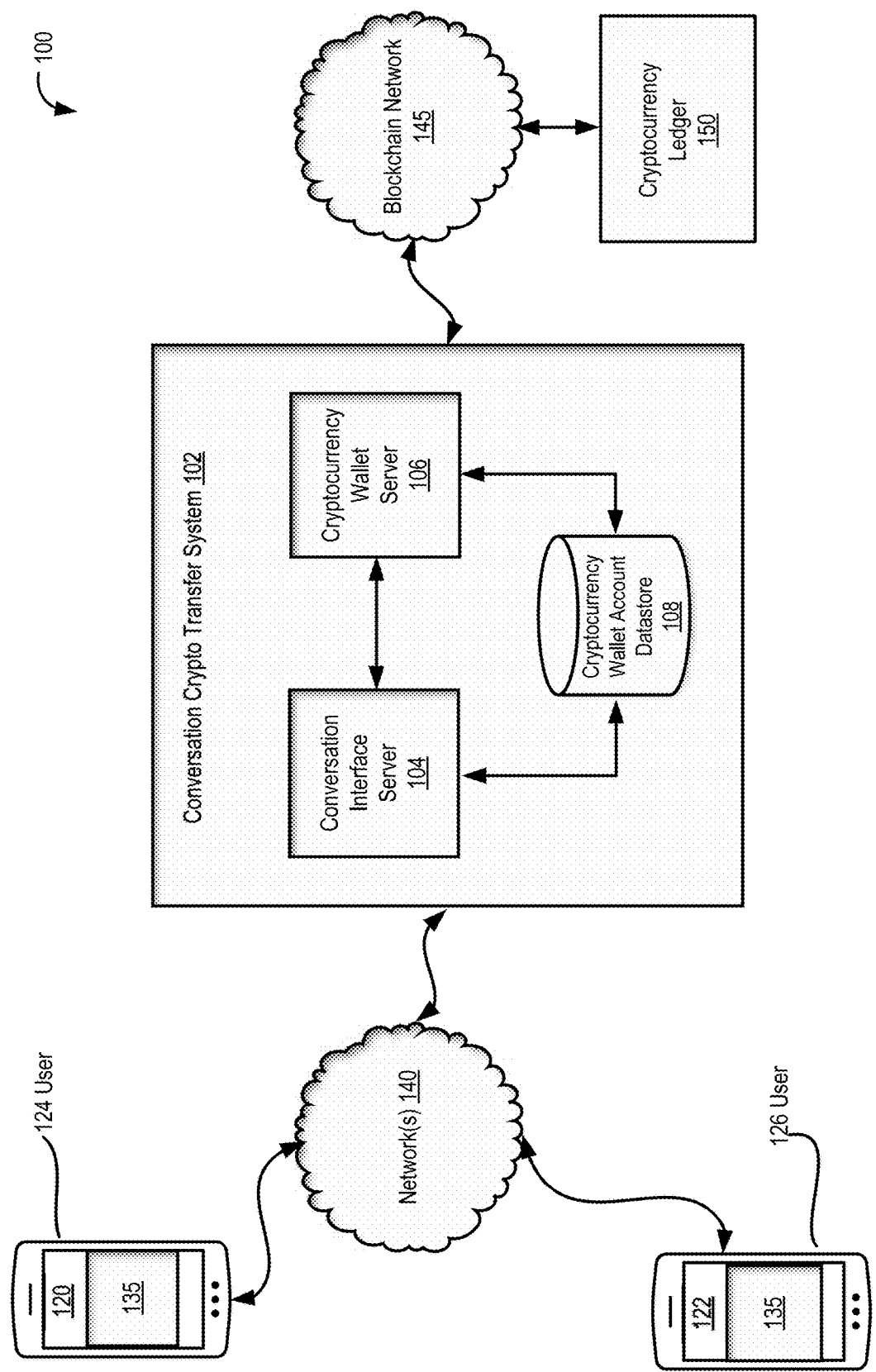
FIG. 1 illustrates an example system for transferring digital assets via a distributed ledger network, according to an implementation of the disclosure.

Before describing the technology in detail, it is useful to describe an example environment in which the presently disclosed technology can be implemented. FIG. 1 illustrates one such example environment 100. FIG. 1 illustrates an example environment 100 for providing a conversation interface assisted by (AA) for enabling a digital asset transfer via a distributed ledger network, in accordance with the embodiments disclosed herein. This diagram illustrates an example environment 100 that may include a conversation crypto transfer system 102, a first user device 120, a second user device 122, a network 140, a blockchain network 145, and a cryptocurrency ledger 150. The first and second devices 120, 122 may be in communication with conversation crypto transfer system 102 via the network 140. The conversation crypto transfer system 102 may include a conversation interface server 104, a cryptocurrency (crypto) wallet server 106, and a cryptocurrency wallet account datastore 108.

Figure 3A:
FIG. 3A illustrates an example conversational interface used to transfer digital assets, according to an implementation of the disclosure.

In some embodiments, the various below-described components of conversation crypto transfer system 102 may be used to initiate a client AA-enabled digital asset transfer application 135 (i.e., a distributed application running on client computing device) within client computing devices 120, 122. For example, client AA-enabled digital asset transfer application 135 may comprise a chat interface (e.g., as illustrated in FIG. 3) and may be configured to enable users to send and receive digital currency and monitor their cryptocurrency balances enabled by crypto wallet server 106 of system 102. A user 124 (e.g., cryptocurrency sender) may be associated with client computing device 120 and a user 126 (e.g., cryptocurrency recipient) may be associated with client computing device 122, as described in detail below. In essence, the AA-enabled digital asset transfer application 135 may be configured to operate like a crypto wallet application.

In some embodiments, the exemplary environment 100 may include an example real-world environment (not illustrated) and an example user-controlled digital environment 112 (e.g., Metaverse) (not illustrated) in communication with network 140.

Account Creation

In a preferred embodiment, each user (e.g., user 124) utilizing the client AA-enabled digital asset transfer application 135 for sending and receiving digital currency and monitor their cryptocurrency balances running on client computing devices (e.g., device 120) may be required to create an account. During account creation, user 124 may be asked to provide a username. The username may be required to follow certain data rules (e.g., only alphanumeric characters, no capital letters, no spaces, and so on). For example, as illustrated in FIG. 3, a user 302 may have a username "Thomas."

In response, the conversation crypto transfer system 102 illustrated in FIG. 1, may generate a pair of keys: a private key and a public key for performing crypto wallet functions. The keys will be associated by system 102 with the username account created by user 124 on AA-enabled digital asset transfer application 135.

Private Key

The private key and public key are configured to have a specific relationship with one another. For example, conversation crypto transfer system 102 may generate a private key by following a high-entropy data generated from a string. For example, from a high entropy hash string, or from a wordlist for creating deterministic keys for the purpose of creating a secure private key that is difficult and/or prohibitively expensive to crack.

To avoid serving as a custodian of private keys, the system 102 will not store private keys withing the datastore 108. Instead, private key may be saved locally on the user device 120, 122. By avoiding storage of private keys within the datastore 108, the system 102 avoids responsibility in the event of a compromising event (e.g., data leak, a malicious attack, and so on), thereby improving the safety of digital asset transactions from both external and internal threats.

Public Key

Next, the system 102 may generate a public key for associating the cryptographic asset on the cryptographic ledger. A public key may be created using a previously generated private key employing a digital signature algorithm. For example, an Elliptic Curve Digital Signature Algorithm (ECDSA) may be used. In some embodiments, a public key may be generated by multiplying the private key with the curve secp256k1 or any similar parameters of the elliptic curve used in public key cryptography. For example, a public key may be generated by multiplying the private key by the curve generator point, consists of 2*256 bits (uncompressed). The resulting ECDSA digital signature may be used to verify the private key (i.e., after signing with public key) thereby failing to verify in the event of tampering.

Additionally, "0x" and the rightmost 20 bytes of the Keccak-256 hash of the ECDSA may be appended to the public key for Ethereum. That is because Ethereum public addresses are composed of the prefix "0x", a common identifier for hexadecimal, concatenated with the rightmost 20 bytes of the Keccak-256 hash of the ECDSA public key (the curve used is the so-called secp256k1). In hexadecimal, two digits represent a byte, meaning addresses contain 40 hexadecimal digits, e.g., 0xb794f5ea0ba39494ce839613fffba74279579268.

Finally, public key may be used to generate a public address which the user can give to the public when transferring digital assets. Public key (and/or public address) may be stored within datastore 108 of conversation crypto transfer system 102. In some embodiments, public key and/or public address may be associated with the newly created user's account. That is, the public key is generated by system 102 only after the account has been established.

In some embodiments, the user may request the system to generate a plurality of public addresses for one public key. The conversation crypto transfer system 102 may associate each username account created within digital asset transfer application 135 with one public key. For example, the data store 108 may store username and associated public key based on a one-to-one relationship. By contrast, the public address may be in a one-to-many relationship with the public key. For example, user may give different public addresses to different individuals for convenience purpose. In some embodiments, conversation crypto transfer system 102 may generate address channels configured to have knowledge of common addresses contextually.

Guest Mode Transfer

In some embodiments, user may utilize the AA-enabled digital asset transfer application 135 when transferring digital assets without requiring user authentication as is necessary with conventional crypto wallet applications. In particular, existing digital wallet applications issue a session token when performing a transfer of digital assets in the given user wallet to another wallet upon the user authenticating their passcode. The session token allows the digital wallet application to access the session and all user information contained in it (e.g., public address of the recipient). Because the session token is generated upon authenticating the user, conventional crypto wallet applications cannot complete the transfer without first authenticating the user. In other words, the user must "sign-in" into the crypto wallet application to make a transfer, thereby making unauthenticated or "guest mode" transfer impossible.

In contrast, the AA-enabled digital asset transfer application 135 allows the user to perform a transfer without first being authenticated with the digital wallet application. The AA-enabled digital asset transfer application 135 is configured to transfer assets by accepting commands that only provide recipients name preceded with a "@" notation. In other words, rather than requiring the user to find the public address of the recipient, the sender can simply invoke the recipient by appending "@" to their name. The recipient's name may be a name of a contact stored within user's local mobile device. The system 102 may construct the raw transfer transaction by retrieving the public address associated with the recipient entered using data structure comprising of username:address (this is also known as username tag (e.g., @name)). By virtue of using the username tag, allows the system 102 to process the transfer of digital assets without generating a session token required by conventional crypto wallets, as alluded to above. In other words, the digital asset transfer application 135 will obtain the public address for any name in the @name notation by using the username:address data structure. In this notation, the "@" would indicate that the adjacent text prior to the next space is the variable containing the public address. For example, @Thomas entered by the user will result to thomas: 0x71c7656ec7ab88b098defb751b7401b5f6d8976f, wherein "thomas" is the username and "0x71c7656ec7ab88b098defb751b7401b5f6d8976f" the public address.

For example, as illustrated in FIG. 3, user 302 "Thomas" (user 124 illustrated in FIG. 1), initiates client conversation application 300 (AA-enabled digital asset transfer application 135 illustrated in FIG. 1). User 302 may be conversing with AA user 301 "Morgan". AA user 301 may provide information in response to user 302 inquiries including transferring digital assets. For example, user 302 may use the @NAME notation. By utilizing AA to transfer digital assets via the @map protocol which retrieves the public address using a username tag, allows the user to perform a transfer without authenticating with the digital wallet application and bypassing the creation of the session token, as described earlier.

Address Book

Upon creating an account and generating a username within AA-enabled digital asset transfer application 135, the system 102 is configured to save username and the public address in a searchable table within datastore 108. Accordingly, when the user invokes the @Name function in a conversation within the interface of application 135, the system 102 is configured to query the public address associated with user and with the recipient stored within the datastore 108 when construct the raw transaction.

Device Contacts

In some embodiments, when the user wants to transfer digital assets and invokes @NAME function for a contact stored locally (i.e., no account was previously created within AA-enabled digital asset transfer application 135), the user will provide the public address and that contact will be stored within their device. This way, the system 102 avoids a need to synchronize the names stored locally and those stored within the datastore 108. By virtue of providing the user with a way to add their own contacts, reduces potential error that could occur when the local contact has the same name as the one stored within the datastore 108. For example, this prevents users form sending transfers to a person named "bob" with an account within the system 102 rather than the "bob" they intended.

Crud Flow with Device and System Contacts

In some embodiments, a CRUD (CREATE, READ, UPDATE, DELETE) flow may be implemented to pair the username (nicknames) entries stored on user's computing device and username entries stored in datastore 108 with a nickname as stored on the user's device locally and override service saved mapping. Further, this flow will be repeated for READ, UPDATE, DELETE, respectively.

In some embodiments, the nicknames as stored on the user's device locally and username entries stored in datastore 108 may be identified separately. For example, the nicknames as stored on the user's device locally and username entries stored in datastore 108 may be highlighted in different colors for user's convenience and highlight to prevent confusion.

As alluded to above, the @map is used by the application 135 to provide specific data toward the construction of the digital asset transfer transaction. In particular, the tags are used identify to provide data to application 135. By virtue of using the @map methodology, the system 102 is configured to use contact data from various social media platforms (e.g., LinkedIn) and/or messaging applications (e.g., Google Messenger). In other words, rather than sending notifications or getting the tagged user's attention, the @map tagging model is configured to extract similar data to other platforms by returning an object of the user data instead of just the address.

Using a Natural Language Transfer Command

In some embodiments, the user may use a natural language ("NRL") command for transferring digital assets. For example, the string may include the following words "Hey Morgan, send @pavan 1000 Bitcoins." The command may include optional and required elements. Options element may be a greeting ("Hey"), name of AA the user is talking to ("Morgan"). Required elements may include an @map action ("@Pavan"), an amount as an integer ("1000"), and a subject ("Bitcoins"). The following is exemplary code generated by the system 102 in response to the natural language command above:

```
from: "0x71c7656ec7ab88b098defb751b7401b5f6d8976f",
to: "0xb794f5ea0ba39494ce839613fffba74279579268",
gasLimit: "21000",
maxFeePerGas: "300",
maxPriorityFeePerGas: "10",
nonce: "0",
value: "100"
```

Note, the address for sender is obtained by virtue of the user's name despite being unauthenticated (i.e., based on the user's name).

In some embodiments, the system 102 may analyze the NRL command using one or more speech analysis techniques. For example, the speech analysis may comprise extracting parts of speech, e.g., nouns, pronouns, adjectives, determiners, verbs, adverbs, prepositions, conjunctions, and interjections. Additionally, the speech analysis may comprise may extract subjects and intent from determiners, nouns and ad/verbs, and values from integers. In some embodiments, conjunctions may be ignored. The extracted parts of speech representing the action and data may be used by the system 102 when constructing the raw transfer transaction. For example, the extracted parts of speech representing the action and data needed to send a transaction may be entered as keys, such that once key:values are available the functions (e.g., @map function) can be used. When these key:values are obtained, a transaction protocol ay be used to construct the transaction. For example, web3.eth.accounts.signTransaction can be used. Additionally, the system 102 may use its own data signature as unique as the conversation that created it. Because the application 135 is essentially a portal to a cloud-based chaindata provider, sending and receiving only requires a public address, while private keys stored on the device and amount. By virtue of providing a simplified interface (i.e., using NRL commands and AA-enabled interface), the application 135 allows the user to perform the transfer with greater accuracy (e.g., no need to enter addresses) and without authentication, thereby reducing the resources necessary for the transfer.

In some embodiments, the system 102 may allow the user to perform a QR code generation and scanning as a method to pass addresses along with @mapping function. For example, by using a camera permission and a QR library to read the QR string, usually a public address, may be implemented to allow users to use the system to do a transaction in person (i.e., physically).

Recipient Verification

In some embodiments, the system 102 may provide wallet owners with a way to guarantee that the digital asset transaction sent was indeed received by the correct or intended recipient. Presently, if the wallet owner or any user of a digital asset transfer platform (e.g., PayPal®) transfers a digital asset to the wrong recipient, they have virtually no way of recovering the assets if the asset was received by the unintended recipient. The present embodiments provide several options for ensuring only intended recipients receive thee For example, one of the options may include a verification step that requests the recipient 126 to provide a confirmation code upon receiving a notification of the digital asset being transferred to them. For example, this can be a SSN or a 4-digit code previously shared by the wallet owner. Upon receiving the correct code, the digital asset transaction is then completed. Alternatively, if the wrong code is entered, then digital asset is not transferred from the owner's 124 digital wallet. Rather, an alert is generated informing the owner 124 that verification failed on receiver side and for security reason AA-enabled digital asset transfer application 135 had stop the transaction. In some embodiments, the wallet owner 124 performing the transaction may instruct the AA to include the verification step by providing a NRL instruction. For example, the owner 124 may say: "Morgan, ask for code."

Figure 3C:
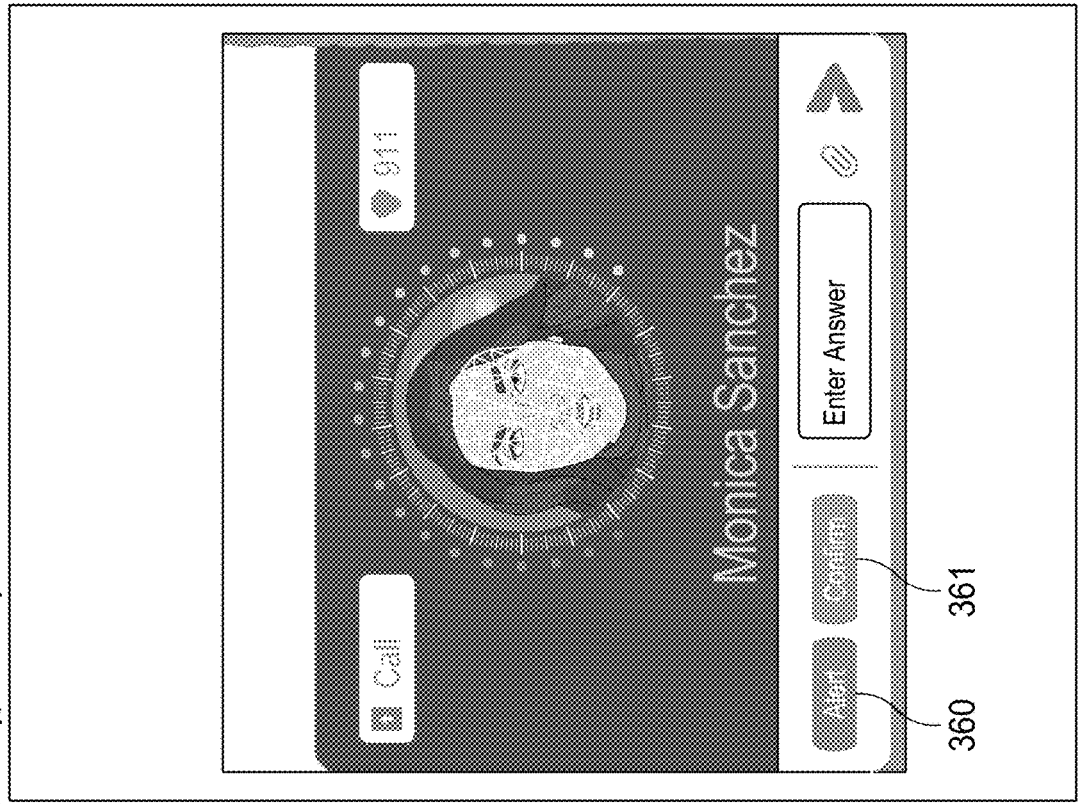
FIGS. 3B-3C illustrate example conversational interfaces used to verify recipient identity, according to an implementation of the disclosure.
Figure 3B:
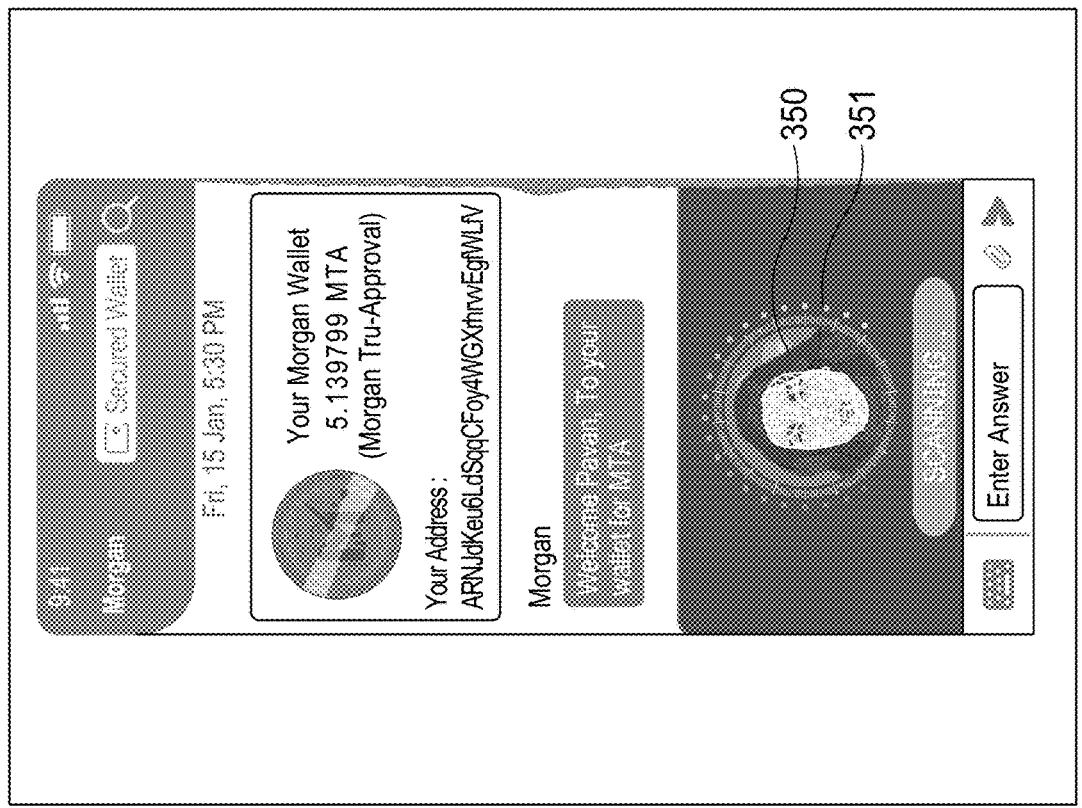

The second option comprises a real-time recipient identity verification. For example, when the wallet owner 124 enters the details of the recipient to whom they are transferring a digital asset to, the recipient 126 may receive a notification asking them to verify their identity by taking a photo of themselves. For example, the photo may be taken by using a camera configured with depth recognition functionality on their user device 122. The photo is then analyzed by the digital asset transfer application 135 to determine whether the image matches the identity of the recipient. For example, as illustrated in FIG. 3B, the owner 124 may see the progress of the analysis illustrated as dots of varying color 351 positioned around the image 350 obtained from the recipient. For example, the color of the analysis dots may indicate that the analysis is completed. In other embodiments, the color of dots may provide the results of the analyses to the owner (with all dots being the changed color representing 100%). For example, if the analysis dots are fully on that means it is a 100% verified photo, if some are missing, then it means the photo is not fully confirmed. As illustrated in FIG. 3C, the owner will receive the photo with options to either deny 360 or approve 361 the transaction. By having the owner view the image taken by recipient ensures that only intended recipient with real-time image verification receive the funds thereby preventing possible fraudulent and catfishing transactions. If the owner is not satisfied with the image, the recipient may get another chance to take a photo. Additionally, by using AA-assisted digital asset transfer application 135, the owner feels that he is being guided by a trusted friend who is always looking out for them and understand that their security and any member around them is of the highest importance. This type of empathetic approach ensures that higher accuracy of transactions.

In some embodiments, analysis may be performed using a machine-learning algorithm. The machine learning algorithm will be continuously learning from every transaction using image verification and future identity verification will be refined. The system will also calculate the percentage of how accurate, secure, or verified the image of the recipient may be.

The application 135 or computing components of system 102 operating the AA may utilize machine learning classifier that is trained based at least in part on images stored in datastore 108 or in cloud-based datastores, or third-party applications (e.g., Google Face recognition folders). For example, application 135 may ask for five images of the recipient stored within recipient's account for confirmation using different positions. For example, a corpus of prior images may be authorized for use in training an artificial intelligence scheme such as a machine learning classifier or neural network. Images from known bad actors and other uses may be used as user inputs. Known identity may be provided as labeled outputs. For example, images from known scammers, may be identified as such. A machine learning classifier, a neural network, or other artificial intelligence model may be trained using these labeled pairs to identify potential bad actor user input and/or confirm identity of a known user. Additionally, the application 135 may determine checks for depth of the image to ensure it was not a photo placed in front of the camera.

Truapproval Integration/NFT

As alluded to above, the application 135 may be used to transfer digital assets (e.g., cryptocurrencies and tokens (both fungible and NFTs)). Because crypto tokens, like cryptocurrency, can hold value and be exchanged, they can be designed to represent physical assets or more traditional digital assets, or a certain utility or service. For instance, there are crypto tokens that represent tangible assets such as real estate and art, as well as intangible assets such as processing power or data storage space.

In some embodiments, real estate agreements that are transacted via a distributed ledger network may comprise smart contracts which are created and recorded to memorialize these real estate agreements, record seller information, record owner information, record contingency information (e.g., financing contingency), record property information including purchase price, lender and the type of preapproval (e.g., guaranteed preapproval), and/or record closing or satisfaction of the agreement.

The smart contract record includes the real-estate agreement, purchase price, property information, and so on, and digital wallet identification(s) for the lender and borrower. In some embodiments, crypto wallet identification(s) for the seller may be included (i.e., public address). Upon its issuance, a smart contract may be initialized to memorialize the guaranteed preapproval.

The guaranteed preapproval can be tracked by a crypto wallet, by a non-fungible token ("NFT"), a smart contract or a smart subcontract, and or any combination of these components. In other words, the guaranteed preapproval may be assigned a cryptographic token linked with a borrower. The borrower may then enter into a real-estate agreement with a seller to buy real-estate backed by the lender (i.e., in the form of issuing a guaranteed preapproval). In other words, when a buyer/borrower enters into a real-estate agreement with a seller, the buyer is using the previously lender issued generated preapproval NFT.

By way of background, by issuing a "guaranteed" preapproval, a lender not only provides the preapproval but essentially backs the mortgage as if the transaction went through. This kind of preapproval removes some of the buyer's risks for the, i.e., not qualifying for the loan despite being preapproved, as discussed above. This reduction in buyer's risks serves to increases the seller's confidence that the transaction will go through and that buyer will be unable to pay the purchase price despite being preapproved. Accordingly, seller is more willing to accept an offer from a buyer that has both waived a financing contingency and secured a guaranteed preapproval from a lender (e.g., this type of offer is known as "TRUApproval" offer from Sun West Mortgage Company, Inc.) than any other offer, including an "all cash" one.

The execution of the agreement may cause a generation of a digital representation of the agreement linked with the buyer and their assigned guaranteed preapproval NFT. Because the agreement is premised on the buyer having the guaranteed preapproval, the cryptographic token assigned to the guaranteed preapproval NFT, discussed above, may be also be linked to the buyer associated with the agreement (i.e., once the agreement between the buyer and the seller is made).

In a preferred embodiment, the user 124 may be a borrower utilizing the client AA-enabled digital asset transfer application 135, described herein, for the purpose of transferring crypto tokens (e.g., TRUApproval NFTs). For example, the application 135 utilized to transfer the token by constructing transactions that will then be stack-queued for approval/denial by the AA, whenever appropriate. The application 135 (i.e., the AA) used to transfer TRUApproval NFTs, will not need to have access to borrower private keys, as those are stored on user device 120.

In some embodiments, TRUApproval NFTs associated with the smart contracts, as discussed above, may be implemented with a multisig (multiple signature) feature which requires signature from AA (i.e., the application 135) and user 124 (borrower). For example, the application 135 can sign the transaction and send it if it's a TRUApproval NFT. That way, the transaction can be sent upon approval from AA (i.e., application 135) for multisig approval.

Figure 4A:
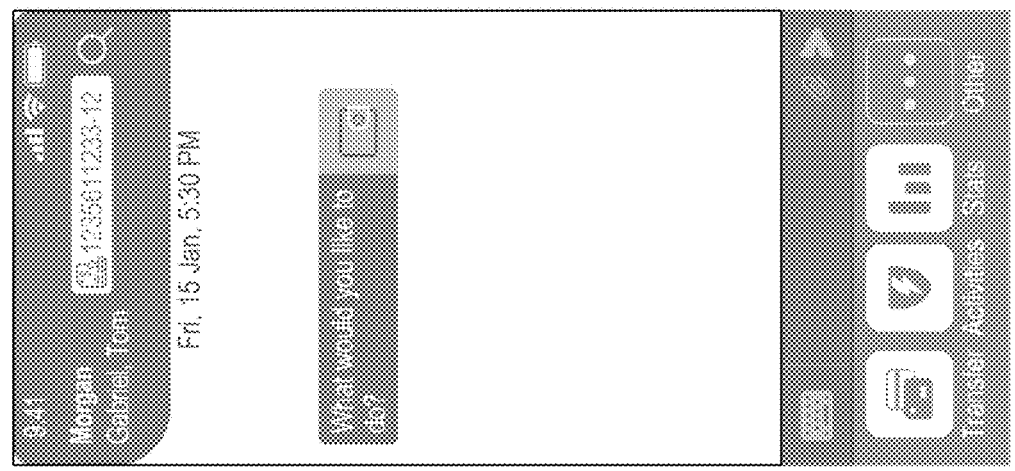
Figure 4C:
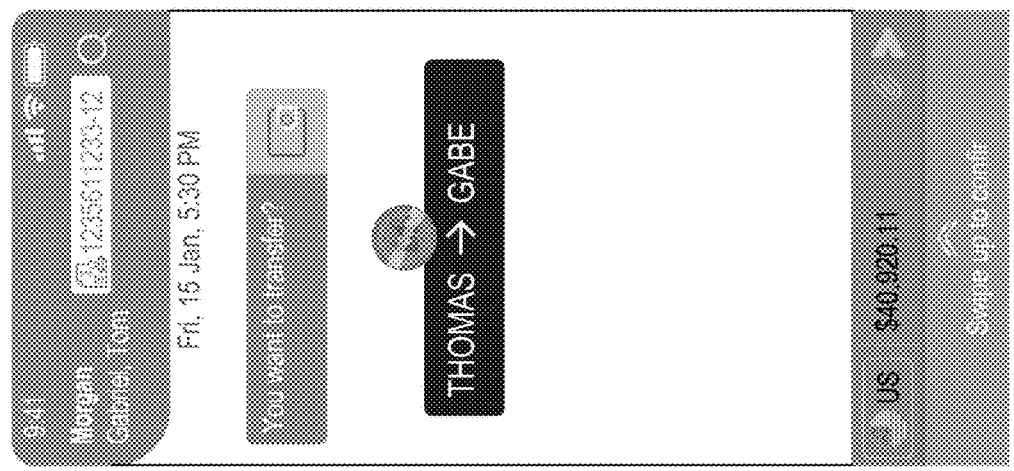

In some embodiments, the digital asset transfer application 135 may be used by the borrower to perform an automated clearing house ("ACH") transaction. Additionally, the transaction may be stored on the blockchain, be publicly verified, and made available in the borrower's crypto wallet. For example, as illustrated in FIGS. 4A-4C, the "Morgan wallet" may be a crypto wallet utilized by user 120.

The application 135 may be utilized by the following actors: Jennifer, a lender, Pavan, a borrower, and Perla, a borrower's real-estate agent. These three actors will be interacting with AA Morgan via the application 135. FIGS. 5A-5F illustrate the conversational interface interactions utilized during the lending process allowing user to purchase real estate.

In particular, an ACH type transaction may be accomplished via application 135 for transferring the money directly into a trust account held by a mortgage company (e.g., Sun West Mortgage Company, Inc.) from the borrower's checking account and that transaction is stored on the block chain. Additionally, the record of the transaction will be available in the consumer's crypto wallet. By storing the record within the block chain (publicly) allows for the transaction to be publicly verified. The public verification aspect is the fundamental tenet of the multi-party transaction, such as a real estate transaction. For example, the multi parties include lender, buyer, seller, closing agent, title company—all need to know the status of the escrow deposit). Essentially, it puts the buyers and sellers in a bidding war with each other as they see exactly what transitions have been made via the public records of the blockchain.

Machine Learning

In some embodiments, AA Morgan may be configured to use one or more of a deep learning model, a logistic regression model, a Long Short Term Memory (LSTM) network, supervised or unsupervised model, etc. In some embodiments, AA Morgan may utilize a trained machine learning classification model. For example, the machine learning may include, decision trees and forests, hidden Markov models, statistical models, cache language model, and/or other models. In some embodiments, the machine learning may be unsupervised, semi-supervised, and/or incorporate deep learning techniques.

Figure 6:
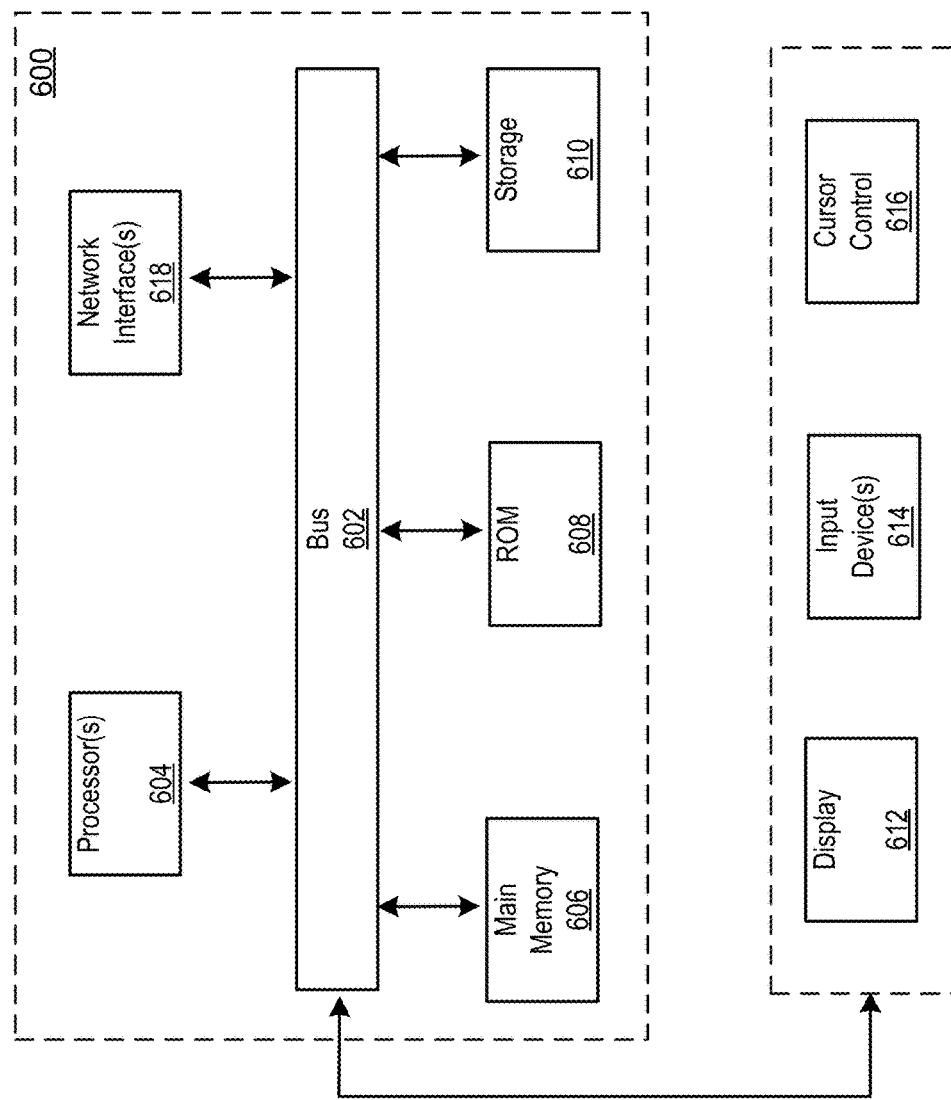
FIG. 6 illustrates an example computing system that may be used in implementing various features of embodiments of the disclosed technology.

System

Where components or modules of the application are implemented in whole or in part using software, in one embodiment, these software elements can be implemented to operate with a computing or processing module capable of carrying out the functionality described with respect thereto. One such example computing module is shown in FIG. 6. Various embodiments are described in terms of this example-computing module 600. After reading this description, it will become apparent to a person skilled in the relevant art how to implement the application using other computing modules or architectures.

Referring now to FIG. 6, computing module 600 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally. The bus 602 may also be connected to other components such as a display 612, input devices 614, or cursor control 616 to help facilitate interaction and communications between the processor and/or other components of the computing module 600.

Computing module 600 might also include one or more memory modules, simply referred to herein as main memory 606. For example, preferably random-access memory (RAM) or other dynamic memory might be used for storing information and instructions to be executed by processor 604. Main memory 606 might also be used for storing temporary variables or other intermediate information during execution of instructions to be executed by processor 604. Computing module 600 might likewise include a read only memory ("ROM") 608 or other static storage device 610 coupled to bus 602 for storing static information and instructions for processor 604.

Computing module 600 might also include one or more various forms of information storage devices 610, which might include, for example, a media drive and a storage unit interface. The media drive might include a drive or other mechanism to support fixed or removable storage media. For example, a hard disk drive, a floppy disk drive, a magnetic tape drive, an optical disk drive, a CD or DVD drive (R or RW), or other removable or fixed media drive might be provided. Accordingly, storage media might include, for example, a hard disk, a floppy disk, magnetic tape, cartridge, optical disk, a CD or DVD, or other fixed or removable medium that is read by, written to or accessed by media drive. As these examples illustrate, the storage media can include a computer usable storage medium having stored therein computer software or data.

In alternative embodiments, information storage devices 610 might include other similar instrumentalities for allowing computer programs or other instructions or data to be loaded into computing module 600. Such instrumentalities might include, for example, a fixed or removable storage unit and a storage unit interface. Examples of such storage units and storage unit interfaces can include a program cartridge and cartridge interface, a removable memory (for example, a flash memory or other removable memory module) and memory slot, a PCMCIA slot and card, and other fixed or removable storage units and interfaces that allow software and data to be transferred from the storage unit to computing module 600.

Computing module 600 might also include a communications interface or network interface(s) 618. Communications or network interface(s) interface 618 might be used to allow software and data to be transferred between computing module 600 and external devices. Examples of communications interface or network interface(s) 618 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications or network interface(s) 618 might typically be carried on signals, which can be electronic, electromagnetic (which includes optical) or other signals capable of being exchanged by a given communications interface. These signals might be provided to communications interface 618 via a channel. This channel might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 606, ROM 608, and storage unit interface 610. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present application as discussed herein.

Various embodiments have been described with reference to specific exemplary features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for transferring a digital asset using natural language commands, the method comprising:
 establishing, by a processor, a first digital wallet in a data store connected to the processor;
 receiving, by the processor, a first user name of a first user for the first digital wallet from a first user device;
 identifying the first digital wallet associated with the first user by using an @map function using the first user name, wherein the @map function resolves user names to public addresses of digital wallets that correspond to the user names without requiring entry of a full cryptographic address;
 upon identifying the first digital wallet, by the processor, logging the first user device into the first digital wallet without requiring session-token-based authentication;
 obtaining a first user input comprising a natural language transfer command displayed within a conversation interface of the first digital wallet, the conversation interface configured to receive user input comprising unstructured natural language, and display assistant user input comprising one or more contextual responses generated by an automated assistant user based on the parsed natural language input of the first user;
 parsing the natural language transfer command to extract one or more entities including a recipient name and digital asset amount;
 identifying a second digital wallet associated with a second user by using the extracted recipient name and the @map function to retrieve a public address associated with the second user;
 verifying a contextual identity of the second user by prompting the second user for image-based verification via the automated assistant user;
 recording, by the processor, a transfer in the first digital wallet for an amount of digital asset from the first digital wallet to the second digital wallet, wherein the automated assistant user confirms the transaction using a secure contextual response protocol based on prior chat history or device context.

2. The method of claim 1, wherein the transfer command comprises a name of the second user preceded with an "@" notation, and wherein the conversation interface parses the @ notation to identify the recipient name without requiring manual entry of the public address associated with the second user.

3. The method of claim 2, wherein identifying the second digital wallet associated with the second user comprises obtaining a recipient's public key retrieved using the @map function and the name of the second user, and wherein the @map function queries a locally or cloud-stored username-to-address mapping to resolve the recipient's public key.

4. The method of claim 3, further comprising storing, by the processor, a public key for the first digital wallet; and
 storing, by the first user device, a private key for the first digital wallet locally on the first user device, wherein the stored public key is distinct from the public key retrieved using the @map function for the second digital wallet.

5. The method of claim 1, further comprising obtaining, by the conversation interface, a first assistant user response from the automated assistant user, wherein the response comprises a dynamically generated request to confirm the digital asset transfer, based at least in part on the context of the first user input.

6. The method of claim 4, further comprising obtaining, by the conversation interface, a second user input from the first user device, wherein the second user input is provided in response to the automated assistant user generating a request to confirm the digital asset transfer.

7. The method of claim 5, wherein the first assistant user response is generated by the automated assistant user based on analyzing a current balance or asset type associated with the first digital wallet to determine whether confirmation of the digital asset transfer is required.

8. The method of claim 1, wherein the automated assistant user is an automated software agent configured to parse natural language input, generate contextual responses based on the parsed natural language input, and facilitate secure digital asset transfers by prompting for user confirmations and verifying transaction parameters.

9. A system for transferring a digital asset using natural language commands, the system comprising:
one or more physical processors configured by machine-readable instructions to:
establish a first digital wallet in a data store connected to the one or more physical processors;
receive a first user name of a first user for the first digital wallet from a first user device;
identify the first digital wallet associated with the first user by using an @map function using the first user name wherein the @map function resolves user names to public addresses of digital wallets that correspond to the user names without requiring entry of a full cryptographic address;
upon identifying the first digital wallet, log in the first user device into the firstdigital wallet without requiring session-token-based authentication;
obtain a first user input comprising a natural language transfer command displayed within a conversation interface of the first digital wallet, the conversation interface configured to receive user input comprising unstructured natural language, and display assistant user input comprising one or more contextual responses generated by an automated assistant user based on the parsed natural language input of the first user;
parsing the natural language transfer command to extract one or more entities including a recipient name and digital asset amount;
identify a second digital wallet associated with a second user by using the extracted recipient name and the @map function to retrieve a public address associated with the second user;
verifying a contextual identity of the second user by prompting the second user for image-based verification via the automated assistant user;
record a transfer in the first digital wallet for an amount of digital asset from the first digital wallet to the second digital wallet, wherein the automated assistant user confirms the transaction using a secure contextual response protocol based on prior chat history or device context.

10. The system of claim 9, wherein the transfer command comprises a name of the second user preceded with an "@"notation, and wherein the conversation interface parses the @ notation to identify the recipient name without requiring manual entry of the public address associated with the second user.

11. The system of claim 10, wherein identifying the second digital wallet associated with the second user comprises obtaining a recipient's public key retrieved using the @map function and the name of the second user, and wherein the @map function queries a locally or cloud-stored username-to-address mapping to resolve the recipient's public key.

12. The system of claim 9, further comprising storing, by the processor, a public key for the first digital wallet; and
storing, by the first user device, a private key for the first digital wallet locally on the first user device, wherein the stored public key is distinct from the public key retrieved using the @map function for the second digital wallet.

13. The system of claim 9, further comprising obtaining, by the conversation interface, a first assistant user response from the automated assistant user, wherein the response comprises a dynamically generated request to confirm the digital asset transfer, based at least in part on the context of the first user input.

14. The system of claim 13, further comprising obtaining, by the conversation interface, a second user input from the first user device, wherein the second user input is provided in response to the automated assistant user generating a request to confirm the digital asset transfer.

15. The system of claim 14, wherein the first assistant user response is generated by the automated assistant user based on analyzing a current balance or asset type associated with the first digital wallet to determine whether confirmation of the digital asset transfer is required.

16. The system of claim 9, wherein the automated assistant user is an automated software agent configured to parse natural language input, generate contextual responses based on the parsed natural language input, and facilitate secure digital asset transfers by prompting for user confirmations and verifying transaction parameters.

* * * * *